Dec. 19, 1939.　　　　C. B. SPASE　　　　2,184,005
CLUTCH
Filed Oct. 16, 1937
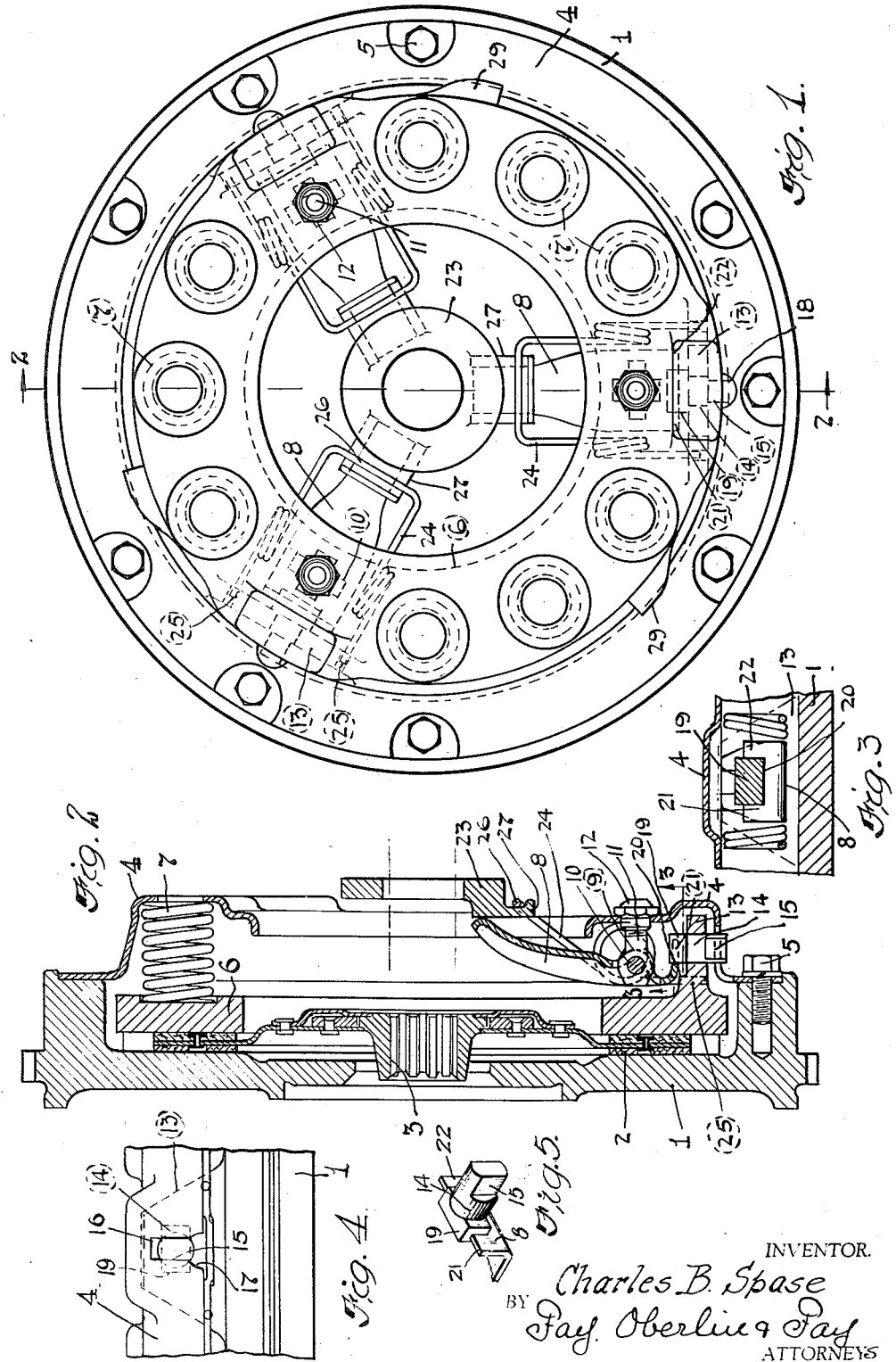
INVENTOR.
Charles B. Spase
BY Fay, Oberlin & Fay
ATTORNEYS Patented Dec. 19, 1939

2,184,005

UNITED STATES PATENT OFFICE 2,184,005

CLUTCH

Charles B. Spase, Syracuse, N. Y., assignor to Ira Saks, Cleveland, Ohio

Application October 16, 1937, Serial No. 169,434

4 Claims. (Cl. 192—68)

The present invention relates to a clutch construction particularly adapted to be used with internal combustion engines. The general object and nature of my invention is to provide a simplified and efficient construction wherein certain parts are maintained in proper alignment and wear is substantially reduced.

Briefly outlined, my invention provides a construction wherein an element known as a driving pin is so constructed and correlated with other parts of the clutch as to serve the plural function of driving the pressure plate, aligning and indexing the latter with respect to the cover plate, presenting a bearing surface or fulcrum point for the operating levers, and finally maintaining alignment of the latter. Additional objects and advantages of the invention shall become apparent as the following description proceeds.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing—

Fig. 1 is a plan view of a clutch construction embodying the principle of my invention; Fig. 2 is a transverse sectional view taken substantially along line 2—2 of Fig. 1; Fig. 3 is an enlarged detail sectional view taken substantially along line 3—3 of Fig. 2 and in the direction of the arrows; Fig. 4 is a detail view of an outside edge portion of the clutch taken in the vicinity of one of the driving pins, and Fig. 5 is a detailed view, in perspective, of one of the pressure plate driving pins.

Referring more particularly to the drawing, there is shown therein a driving member consisting customarily of a flywheel 1, a driven member consisting of a clutch plate 2 mounted upon the splined hub 3 to which the driven shaft (not shown) is attached, and the cover plate 4 mounted upon the flywheel 1 by means of the fastening studs 5. A pressure plate 6 is normally urged against the clutch plate 2 by means of the pressure spring 7 mounted between the pressure plate 6 and the cover plate 4.

An operating lever 8, of which there are three in number in the present illustrated embodiment, as will be seen from Fig. 1, has an intermediate curved or semi-circular portion 9 which is adapted to fit over the cross pin 10 carried by by the eye-bolt 11 which, in turn, is attached to the cover plate 4 by means of the nut 12. A laterally extending boss 13 (of which there are also three in number and spaced in registry with the operating levers 8) is positioned on the pressure plate 6 near its outer periphery. A radially extending driving pin 14 is mounted in the laterally extending boss 13 and has an outer, flat side portion 15 which is adapted to engage with the slot 16, in the cover plate 4. The outer end of the slot 16, viz., the end nearest the pressure plate 6, is enlarged as indicated at 17 and 18. The enlargement 17 functions as a guide for facilitating the assembly of the cover plate 4 over the pressure plate 6. The enlargement 18 permits the marginal flange of the cover plate 4 to clear the end of the driving pins 14 during assembly.

The inner end 19 of the driving pin 14 is of rectangular cross-sectional form whereby it presents a flat side against which the rounded edge portion of the operating lever 8 contacts as a fulcrum or bearing point. Such round edge portion 20 enables a line contact between the operating lever 8 and the driving pin portion 19 whereby a knife-edge lever action is obtained and the wear upon the lever is thereby reduced. Projecting portions or prongs 21 and 22 extend beyond the rounded edge portion 20 of the lever 8 and contact with the flat side portion 19. The prongs 21 and 22 operate to maintain the lever 8 in alignment and to prevent it from twisting around its longitudinal axis.

A lever-operating release bearing 23 is adapted to contact with the inner ends of the operating levers 8. U-shaped wire springs 24 have their free ends 25 anchored or mounted in openings in the bosses 13, and their closed ends 26 connected to the outwardly extending brackets 27 on the release bearing 23. The springs 24 function to hold the release bearing 23 against the operating levers and to thereby urge the latter to draw the pressure plate 6 towards the cover plate 4, thus holding the lever 8 tightly against the fulcrum points 9 and 20.

Ventilating louvers 29 having their open ends extending in a direction opposite to that of the rotation of the clutch are provided in the side walls of the cover plate 4 at points of location of the operating levers 8. By so locating the louvers 29, any weakening effect which they might have upon the side wall of the cover plate 4 is removed from the areas where the operating lever forces are applied. The louvers 29 serve as means for ventilating and cooling air out from the interior of the clutch and to thereby produce a cooling effect upon those parts which are subject to wear and friction, so as to aid in prolonging the life of such parts.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a clutch, the combination of a pressure plate, a cover plate having an axially extending side wall and a radially extending flange, radially extending pins carried by said pressure plate, and axially extending slots in said cover plate for engaging with said pins, said slots being enlarged at a point adjacent the juncture of said side wall and flange to clear and guide said pins during assembly of the clutch.

2. In a clutch, the combination of a pressure plate, a cover plate having an axially extending side wall and a radially extending flange, radially extending pins carried by said pressure plate, and axially extending slots in said cover plate for engaging with said pins, said pins having flat side portions for fitting in said slots, said slots being enlarged at a point adjacent the juncture of said side wall and flange to clear and guide said pins during assembly of the clutch.

3. In a clutch, the combination of a pressure plate, a cover plate, radially extending pins carried by said pressure plate, axially extending slots in said cover plate for engaging with said pins, said pins having flat side portions for fitting in said slots, and operating levers having a slotted, load delivery end adapted to fit over and bear directly against other flat side portions on said pins.

4. In a clutch, the combination of a pressure plate, a cover plate, bosses projecting from the face of said pressure plate, radially extending pins carried by said bosses, axially extending slots in said cover plate adapted to engage with the outer ends of said pins, operating levers having slotted, load delivery ends adapted to fit over and bear directly against the inner ends of said pins, a release bearing contacting the inner ends of said levers, and U-shaped wire springs having their open ends anchored in said bosses and their closed ends connected to said release bearing.

CHARLES B. SPASE.